Patented June 16, 1953

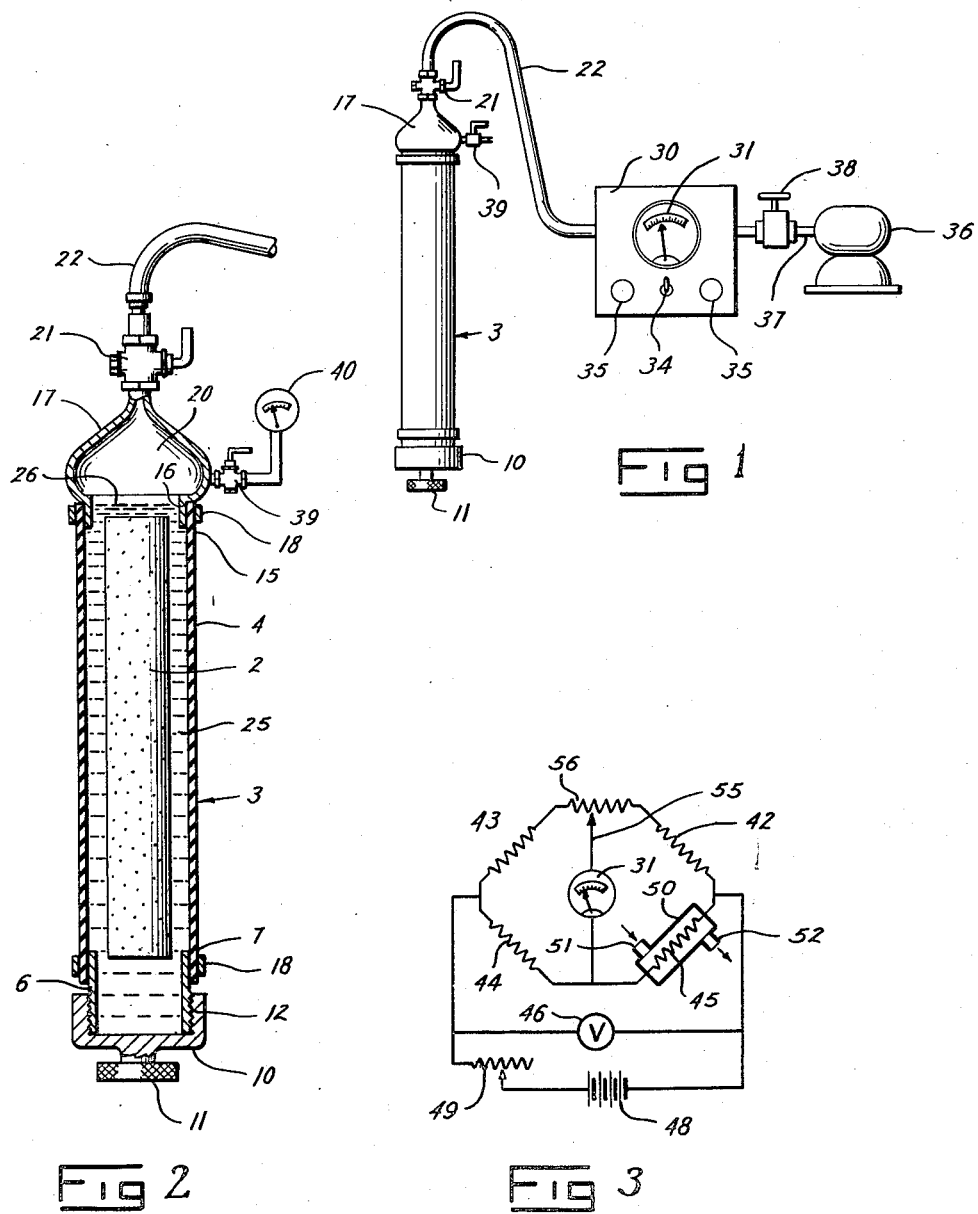

2,641,922

UNITED STATES PATENT OFFICE 2,641,922

CORE ANALYSIS

Alonzo L. Smith, Houston, Tex.

Original application October 16, 1944, Serial No. 558,948. Divided and this application August 30, 1950, Serial No. 182,289

3 Claims. (Cl. 73—23)

This invention relates to a means for core analysis.

This application is a division of my prior copending application Serial No. 558,948, filed October 16, 1944, which application matured into U. S. Patent No. 2,531,083, issued November 21, 1950.

It has long been the practice to obtain cores of a material for examination to obtain an indication of the type or substance of the material being cored, or for the purpose of examining the core to determine its contents.

One type of such cores are those taken from wells. The cores may be taken with standard or wire line coring equipment or by taking side wall samples. Regardless of how the core is taken, however, it is desirable to analyze it to ascertain its contents with a view of determining the probable productivity of the formation. Usually the core is analyzed to determine its oil, gas, or water content and the nature of its porosity or permeability.

In accordance with the present practice, the core is subjected to pressure or temperature applications with a view of determining the contents. Such application, however, involves considerable time and equipment in order to obtain indications of the contents of the core.

The present invention contemplates a simple and economical piece of equipment which can be readily used at the drilling location with a view of quickly and accurately determining the nature and the contents of the core.

It is one of the objects of the present invention to enclose a core in a flexible container, so that the core, after being sealed in the container, may be readily broken into smaller portions with a view of releasing the materials entrained in the core.

Another object of the invention is to provide a flexible core container wherein a core may be sealed in the condition that it is received from the well so that it may thereafter be broken into smaller particles with a view of releasing any fluids which may be contained in the interstices of the core matter.

Another object of the invention is to provide a flexible core breaking container whereby the core may be analyzed.

Still another object of the invention is to provide a system of core analysis whereby the core is placed in a container, broken into smaller particles by flexing the container and any gas released by the core then extracted and burned as an indication of the core contents.

Still another object of the invention is to analyze a core for gas contents by breaking the core while it is in a sealed container and extracting the gas from the container for analysis.

Still another object of the invention is to analyze the core by immersing it in a liquid in a closed container and then breaking the core to release the contents of the core for analysis.

It is also an object of the invention to provide a combustion type meter for gas analysis where the gas is withdrawn from a container after having been released from the core due to the breaking of the core into smaller particles.

Still another object of the invention is to analyze a core for oil content by immersing the core in a liquid which is immiscible with oil and then breaking the core into smaller particles so that any oil thereby released may be observed upon the surface of the liquid by examination under ultra violet light rays.

A still further object of the invention is to deposit a core in a liquid in a container which is thereafter sealed, where the container is flexible so as to permit a breaking up of the core and the washing of the particles by the liquid in the container.

A still further object of the invention is to place a core in a container and to flex the container so as to break up the core and thereafter withdraw from the container any gaseous fluid released from the core.

Still another further object of the invention is to enclose a core in a flexible container and to thereafter comminute the core so as to release the contents thereof.

Still another object of the invention is to comminute a core by enclosing it in a container and flexing the container so as to release the contents of the core while retaining such released material within the container.

Other and further objects of the invention will be readily apparent when the following description is considered in connection with the accompanying drawings wherein:

Fig. 1 is a diagrammatic view illustrating an arrangement of the equipment for practicing the invention.

Fig. 2 is an enlarged vertical sectional view of the flexible container with the core disposed therein.

Fig. 3 is a wiring diagram of the combustion circuit for detecting gas released in the container.

A core which may have been taken in any desired manner is seen at 2 in Fig. 2 as having been positioned in a container 3. This container is of peculiar construction in that the principal body portion thereof is made up of a flexible sleeve 4 of rubber or other suitable material. This sleeve 4 may be reinforced if desired so as to withstand the stresses and strains applied to it in effecting the comminution of the core therein.

The container is formed by enclosing the ends of the sleeve 4 as seen in Fig. 2 by inserting the nipple 6 inside of the end 7 of the sleeve and affixing it with a suitable retainer band 18. The nipple 6 is then closed by a cap 10 having the knurled handle 11 so that it may be tightly affixed on the nipple by the threads 12.

The upper end 15 of the sleeve 4 is slipped over the shank 16 of the bonnet 17 and held in position with a retainer band 18.

The bonnet 17 is arranged to provide a chamber 20 having a valve 21 and a hose, pipe, or other connection 22 leading therefrom.

In this manner, any fluid either gaseous or liquid, accumulating in the container can be drawn out if desired.

In practicing the invention, the core 2 will be taken from the well and it need not be washed, treated, or otherwise unduly handled, but may be inserted directly into the container 3 even though the core is coated with mud as such cores usually are when they are retrieved from the well.

The container may be empty if desired when the core 2 is inserted or it may have a liquid 25 therein of any suitable character, depending upon the type of analysis to be accomplished. If the core 2 is being analyzed for its gas content, then the liquid 25 may be water and the container will be filled with water say to the level 26 in the bonnet, leaving the chamber 20 occupied by air.

With the parts in this position, the container 3 is now grasped and the sleeve portion 4 is flexed so as to break the core 2 into different sized particles. If necessary, the container may be hammered or force otherwise applied thereto with a view of breaking up the core or comminuting it so that any gas entrained in the interstices of the core material will be released. The presence of but a small portion of air in the bonnet or chamber 20 prevents the dilution of the gas with air to any substantial extent. The gas will naturally rise through the liquid and accumulate in the chamber 20. One of the essential features of the invention is that the core is broken up and the contents thereof released inside of the closed container 3. In this manner none of the contents of the core are washed away or permitted to escape into the atmosphere. All of the core is retained inside of the container and all of the material released by the comminuting of the core is trapped or retained in the container.

If the material for which the core is being analyzed is the gas content, the connection 22 may be connected to a gas analysis meter 30. This meter may be of the type such for instance as that disclosed and claimed in my copending application Serial Number 230,274, filed September 16, 1938. Such meter may be of any other desired type, however, so long as it includes some means of determining the amount of gas which passes into the meter from the pipe 22. In Fig. 1 this meter 30 is shown as having an indicator 31 which may be calibrated as to sensitivity but preferably so that it gives an indication of the volume of the gas. A control switch 34 is provided and the controls 36 adjusted to balance the instrument to place it in operation.

A suction pump 36 is connected by a tubing 37, controlled by a valve or regulator 38, to the combustion meter through the tubing 22 and from the chamber 20 so that an indication of the nature and volume of the gas may be determined. To permit the withdrawal of the gas from the chamber 20, an adjustable control valve 39 is provided and by manipulation thereof a regulated flow of air can be admitted from the outside atmosphere. Such admission allows the gases to be drawn out of the chamber 20 through the connection 22 and into the meter.

A very sensitive pressure gauge 40 may be applied to the valve 39 or at some other location so as to indicate any change in pressure in the chamber 20. Such a change might be due to release of gases from the core when it is broken or agitated. The rate of change of such pressure may be used as an indication of the permeability of the core.

The combustion meter 30 is of the electrical Wheatstone bridge type where one-half of the circuit is arranged to be balanced with the other half. As seen on Fig. 3 the top or one-half of the circuit or bridge is made up of the resistor 42 and 43 while the filaments 44 and 45 from the other or lower half of the bridge. The filament voltage in the bridge circuit is supplied by the battery 48 therein as a source of power, controlled by rheostat 49 and indicated on filament voltmeter 46.

In operating the bridge circuit, the filament voltage is adjusted to the proper voltage by the rheostat 49 as indicated by the voltmeter 46. The variable resistance 55 and 56 is adjusted until there is no potential difference between the upper and lower sections of the circuit and is indicated by a zero flow on the millivolt meter 31 indicating that the circuit is balanced.

The filament 45 of the bridge has been shown as enclosed in a small housing 50, having an inlet 51 and outlet 52. The inlet may be connected to the pipe 22 while the outlet is connected to the pipe 37, leading to the suction pump 36. It seems obvious that the temperature of the filament 45 will vary in accordance with the amount of gas which is present and available for combustion. The resistance of the filament 45 increases as a function of the amount of heat or combustible mixture present. This change causes a current flow across the meter 31. The meter 31 is in turn calibrated as a function of the combustible gas volume.

The extraction rate of gas flow from the core chamber 20 may be varied by varying the vacuum pump regulator 38 and the air inlet 39 to regulate the intake of gas from the core chamber for determining the time element of the burning action taking place, so as to establish a period of time duration, which is indicative of the volume of gas present in the core.

With the foregoing structure, it seems clear that a simple and economical apparatus has been devised which can be utilized to determine the gas in a core sample in an efficient manner. When the core is broken up, the liquid 25 may be flushed through the core by applying pressure and agitation to rubber container 3 so as to wash the individual particles of the core and flush out any gas or material in the core particles.

A flushing fluid of non-combustible solvent such as carbon tetrachloride may be used for flushing the core in place of water or air. It is understood that liquid need not be used unless desired or that a fluid having suitable properties to recover the indication desired.

The device may be used for analyzing cores for any desired material with a view of determining its contents or characteristics. For instance if the core is to be examined for the oil content thereof, the liquid 25 may be water with which the oil is immiscible and thus when the core is comminuted and particles of oil released, they will rise to the surface 26 of the liquid in the container. If the bonnet 17 is now removed, the surface 26 may be examined under ultra violet light rays to determine the presence or absence of oil. An instrument for conducting such an observation is shown in my prior Patent No. 2,206,922, issued July 2, 1940. Instead of removing the bonnet 17, however, the surface of the liquid 25 might be passed through the tubing 22 and into the meter of a violet light ray box for observation or recording.

The pore space inside cores is indicative of the porosity of the core and by detecting and measuring the volume of gas extracted from a known size core or sample, it is possible to determine the relative porosity of the petroleum formations for producing the greatest yield of petroleum.

An indication of the permeability of a formation may be obtained with the device by noting the elevation of the liquid in the container at the time the core is first immersed as compared with its elevation later on in the examination when the liquid has had an opportunity to permeate the core particles.

While the device has been shown as being applied to cores taken from wells, it seems clear that it could be applied to soil samples taken at the surface or to any type of material which is believed to be capable of yielding an indication of its contents when the core or sample is broken down.

Broadly, the invention contemplates a means and method of core or sample analysis, whereby the release of materials from a confined core or sample is obtained as the core is comminuted to increase the efficiency and facility of analysis.

What is claimed is:

1. A device for indicating the release of gas from a core sample comprising a closed container for the sample, a bonnet of rigid non-flexible material at one end of the container for sealing the container and collecting gas, said container being a tube of flexible material to permit breaking or flushing of the core by bending while the core sample is sealed within the tube to release gas from the pores of the core, and means connected to said container to show any variation in the pressure within the container as an indication of the release of gas.

2. A device for indicating the release of gas from a core sample comprising a container for the sample, means sealing the container, said container being a tube of flexible material capable of being bent laterally to permit breaking or flushing of the core by bending while the core sample is sealed within the tube to release gas from the pores of the core, means connected to said container to show any variation in the pressure within the container as an indication of the release of gas, where the rate of change will be indicative of the permeability of the core, and additional means connected to said container to analyze the gas released.

3. A gas detecting apparatus for cores and formation samples from wells, comprising container means to house the core or sample in the presence of water and air in said container, said container means being a flexible tube to receive therein the sample, flexible walls on said tube to agitate the sample by flushing the sample with said liquid to release gas from the sample and to create a mixture of gas with the air while said container remains closed, said container having an outlet tube at one end thereof, a valve in said tube to close said container during agitation of the sample and to open said container for the discharge of gas therefrom, and means connected to said outlet tube to analyze the gas in air mixture to detect gas from the sample or core.

ALONZO L. SMITH.

References Cited in the file of this patent

UNITED STATES PATENTS

| Number | Name | Date |
| --- | --- | --- |
| 2,138,141 | Cromer et al. | Nov. 29, 1938 |
| 2,192,525 | Rosaire et al. | Mar. 5, 1940 |
| 2,514,690 | Bliss et al. | July 11, 1950 |
| 2,531,083 | Smith | Nov. 21, 1950 |